3,322,757
PROCESS FOR THE PREPARATION OF ESTER AMIDES OF CARBOCYCLIC AROMATIC DICARBOXYLIC ACIDS
Hans-Leo Hülsmann, Witten-Rudinghausen, and Gustav Renckhoff, Witten (Ruhr), Germany, assignors to Chemische Werke Witten GmbH, Witten (Ruhr), Germany
No Drawing. Filed July 31, 1964, Ser. No. 386,777
11 Claims. (Cl. 260—247.2)

This invention relates to the preparation of ester amides of dicarboxylic acids. More particularly, it relates to a process for the preparation of alkyl ester amides of carbocyclic aromatic dicarboxylic acids. Even more particularly, the invention relates to the preparation of alkyl ester amides of the above-named acids whose carboxyl groups are not ortho to each other.

In accordance with German patent application C27,407 IVb/12o (now German Auslegeschrift 1,168,413 and corresponding to U.S. Patent 3,252,977, issued May 24, 1966), ester amides of carbocyclic aromatic dicarboxylic acids may be prepared by reacting the methyl phenyl esters of carbocyclic aromatic dicarboxylic acids with ammonia or primary or secondary mono- or diamines, preferably in equivalent amounts, in inert organic solvents, preferably aromatic hydrocarbons, at temperatures of from 0° to 150° C., preferably from 60° to 100° C. Ester amides of carbocyclic aromatic dicarboxylic acids may also be prepared, according to German patent application C28,916 IVb/12o (now German Auslegeschrift 1,187,602), by employing methyl aryl esters, the aryl residues of which are derived from phenols and/or naphthols substituted by one or several alkyl and/or aralkyl groups for the reaction, instead of or in addition to the methyl phenyl esters of the above-named carbocyclic aromatic dicarboxylic acids. The methyl aryl esters may be used alone or in mixture with each other in the reaction.

One of the objects of the present invention is to provide an improved process for the preparation of alkyl ester amides of carbocyclic aromatic dicarboxylic acids.

Another object of the present invention is to provide a process for the preparation of alkyl ester amides of carbocyclic aromatic dicarboxylic acids which may be carried out in an efficacious, simple, and economical manner.

A further object of the invention is to provide a process that gives alkyl ester amides of carbocyclic aromatic dicarboxylic acids in good yield.

A still further object of the invention is to provide a process that gives alkyl ester amides of carbocyclic aromatic dicarboxylic acids in an extremely advantageous and economical manner since no worthless byproducts are obtained thereby.

These and other objects of the present invention will become apparent to those skilled in the art from a reading of the following specification and claims.

In accordance with the present invention, it has been found that alkyl ester amides of carbocyclic aromatic dicarboxylic acids with meta- and para-positioned carboxyl groups may be prepared by utilizing alkyl aryl esters, the alkyl residues of which are derived from alkanols containing 2 to 5 carbon atoms, instead of the methyl aryl esters of these acids.

The preparation of the alkyl aryl esters of carbocyclic aromatic dicarboxylic acids employed according to the method of the present invention is preferably effected by heating the dialkyl esters derived from these acids and alkanols containing 2 to 5 carbon atoms with phenols or naphthols, which may be substituted by alkyl or aralkyl groups, in the presence of ester radical interchange catalysts to temperatures above 160° C., while distilling off the corresponding split-off alkanol, and recovering the alkyl aryl ester in pure form by distillation or crystallization. Preferably, the dialkyl esters and phenols or naphthols are used in equivalent amounts, i.e., one mole of phenol or naphthol for each alkyl ester group. However, more phenol or naphthol per alkyl ester group may be used if the reaction is prematurely interrupted after cleavage of the amount of alkanol calculated for formation of the alkyl aryl ester. Any non-reacted dialkyl ester and diaryl ester obtained as by-product may be returned to the reaction batch for a subsequent ester radical interchange.

The alkyl residue of the alkyl aryl esters used in the method of the present invention may be derived from monohydric straight-chain or branched saturated alkanols containing 2 to 5 carbon atoms, for example, ethanol, propanol, butanol, 2-methylpropanol, etc.

The parent substances of the aryl residues may be monohydric phenols or naphthols which are substituted, if desired, by one or several alkyl or aralkyl groups. Examples of such compounds are phenol, the isomeric cresols or xylenols, butylphenols, octylphenols, benzylphenols, the isomeric naphthols, etc.

The following compounds can be mentioned as examples of dicarboxylic acids to be used in the present invention: iso- and terephthalic acid, the isomeric diphenyl dicarboxylic acids and the iso- and terephthalic acids which are mono- or di-substituted in the nucleus, such as 5-chloroisophthalic acid, methylterephthalic acid, 2,5-dichloroterephthalic acid, etc.

The selective amidation of the aryl ester group takes place by reacting the alkyl aryl esters of the above-named dicarboxylic acids with ammonia or with primary or secondary aliphatic or aromatic or heterocyclic mono- and diamines. Examples of these amines include the primary alkyl amines having 8 to 18 carbon atoms, diamines such as ethylenediamine, hexamethylenediamine or xylenediamine, morpholine and others.

It is surprising that only the aryl ester group reacts with the amine under the afore-mentioned reaction conditions. The alkyl ester group is not affected thereby. The yields of alkyl ester amides are generally practically quantitative. The phenolic compound given off during the amidation may be recovered easily and utilized again for the ester radical interchange of a dicarboxylic acid dialkyl ester to give an alkyl aryl ester. Since no worthless byproducts are obtained, the process works in an extremely economical manner.

The ester amides prepared in accordance with the present invention may be used in ways known in the art, for example, for the preparation of thickening agents for lubricant fats, as bases for the production of polycondensation products, etc.

The following examples are given merely as illustrative of the present invention and are not to be construed as limiting.

*Example I*

A solution of 14.9 parts by weight of butyl phenyl terephthalate (0.05 mole) in 50 ml. benzene is heated to reflux temperature. A solution of 13.5 parts by weight of stearylamine (0.05 mole) in 50 ml. benzene is proportionately added thereto over a period of 20 minutes, while the solvent boils constantly. When the addition of the amine solution is terminated, the batch is heated to 80° C. for one more hour. During cooling of the solution in an ice bath, 14.0 parts by weight of N-octadecylterepthalamide acid butyl ester is precipitated. This product has a melting point of 87° C. Another 5.0 parts by weight of the ester amide is separated from the concentrated mother liquors during cooling. This product has a melting point of 86 to 87° C. The yield amounts to 80.5% of the theoretical. After recrystallization from butyl acetate and methanol, the melting point is found to be 89° C. The acid number of the ester amide is 0, the saponification number 117 (calculated as 119) and the percentage of N=3.3% (calculated as 3.0%).

Example II 13.5 parts by weight of ethyl phenyl isophthalate (0.05 mole) dissolved in 50 ml. benzene is reacted, as described in Example I, with 10.6 parts by weight of tetradecylamine (0.05 mole) is 50 ml. benzene. The N-tetradecylisophthalamide acid ethyl ester, which remains as product in a practically quantitative yield after the distillation of the benzene and phenol, melts at 56.5° to 58.0° C. after recrystallization from methanol. The acid number of the ester amide is 1, the saponification number is 139 (calculated as 144), and the percentage of N=3.5% (calculated as 3.6%).

Example III 33.4 parts by weight of hexamethylenediamine (0.288 mole) in 100 parts by volume of xylene is added dropwise to a solution of 181 parts by weight of butyl phenyl terephthalate (0.607 mole) in 500 parts by volume of xylene with stirring in a nitrogen atmosphere at 130° C. The dropwise addition takes one half hour. When the addition of the amine solution is completed, the clear solution is heated under nitrogen to boiling on the reflux cooler for another hour. Thereafter, cooling is effected and the crystallized ester amide is suctioned off. It is heated to boiling with 400 parts by volume of xylene, cooled and suctioned off. This purifying operation is repeated once more. After drying at 75° C., 133 parts by weight of N,N'-bis (p-carbobutoxybenzoyl) hexamethylenediamine is obtained, which corresponds to 88.2% of the theoretical, based on the amount of diamine employed. The melting point of the product is 191.5° C. to 192.0° C., the acid number is 0.5, and the saponification number is 214 (calculated as 214).

Example IV 20.2 parts by weight of ethyl phenyl isophthalate (0.075 mole) is dissolved in 100 parts by volume of xylene. A solution of 4.5 parts by weight of hexamethylenediamine (0.038 mole) is added within one half hour, while the xylene boils under reflux. When the addition of the amine solution is completed, the batch is kept at 80° C. for another 2 hours. During cooling, 10.0 parts by weight of colorless crystalline N,N'-bis(m-carboethoxybenzoyl) hexamethylenediamine is precipitated. This product has a melting point of 137° to 138° C. Another 7.3 parts by weight of the ester amide having a melting point of 137° to 139° C. is obtained from the mother liquor by recrystallization from xylene after distillation of the xylene and phenol. The acid number of the ester amide is 1.1, the saponification number is 236 (calculated as 239), and the percentage N=6.1% (calculated as 6.0%). The yield of ester amide corresponds to 98.5% of the theoretical, relative to the amount of ethyl phenyl isophthalate employed.

Example V

A solution of 5.65 parts by weight of morpholine (0.065 mole) is added dropwise to a boiling solution of 17.5 parts by weight of ethyl phenyl isophthalate (0.065 mole) in 100 parts by volume of benzene. The addition takes 40 minutes. The solution is then kept at 80° C. for 3 more hours. During the distillative treatment and after distillation of the benzene, 5.3 parts by weight of phenol distills over. This corresponds to 84% of the amount calculated for formation of the ester amide product. After a preliminary run up to 196° C. at a pressure of 1 torr, 13.1 parts by weight of isophthalic acid ethyl ester morpholide (corresponding to 76.5% of the theoretical) distills off. Thereafter the product is obtained at 196° to 200° C. and a pressure of 1 torr. The ester amide product is a colorless, non-crystalline oil.

Example VI

Solutions of 156 parts by weight of butyl m-cresyl terephthalate (0.5 mole) in 500 parts by volume of xylene and of 29 parts by weight of hexamethylenediamine (0.25 mole) in 100 parts by volume of xylene are combined at 130° C. and heated for one hour to boiling with reflux of the xylene. After cooling to room temperature, the crystallized colorless N,N'-bis(p-carbobutoxybenzoyl)hexamethylenediamine is suctioned off, digested with hot xylene and suctioned off again after cooling. 106 parts by weight of the ester amide is obtained, which corresponds to 81% of the theoretical. After recrystallization from dimethylformamide, the melting point of the product is 190° to 191° C., and the saponification number is 209 (calculated as 214).

The invention being thus described, it will be obvious that the same may be varied in many ways. Such variations are not to be regarded as a departure from the spirit and scope of the invention and all such modifications are intended to be included within the scope of the following claims.

We claim:
1. A process for the preparation of alkyl ester amides of carbocyclic aromatic dicarboxylic acids which comprises reacting an alkyl aryl ester of a carbocyclic aromatic dicarboxylic acid having the carboxyl groups thereof positioned meta or para with respect to each other, said alkyl group of said alkyl aryl ester being saturated and having from 2 to 5 carbon atoms and said aryl group of said alkyl aryl ester being derived from a monohydric phenol or naphthol, with a nitrogen compound selected from the group consisting of ammonia and primary and secondary mono- and diamines in an inert organic solvent at temperatures of from 0° to 150° C.

2. Process according to claim 1, wherein said monohydric phenol or naphthol is selected from the group consisting of phenol, naphthol and alkyl- and aralkyl-substituted phenols and naphthols.

3. Process according to claim 1, wherein the reaction is carried out at temperatures of from 60° to 100° C.

4. Process according to claim 1, wherein the inert organic solvent is an aromatic hydrocarbon.

5. Process according to claim 1, wherein said alkyl aryl ester and said nitrogen compound are reacted in equivalent amounts.

6. Process according to claim 1, wherein the carbocyclic aromatic dicarboxylic acid is selected from the group consisting of isophthalic acid and terephthalic acid.

7. A process for the preparation of alkyl ester amides of carbocyclic aromatic dicarboxylic acids which comprises heating a dialkyl ester of a carbocyclic aromatic dicarboxylic acid having the carboxyl groups thereof positioned meta or para with respect to each other, the dialkyl groups of said dialkyl ester being saturated and having from 2 to 5 carbon atoms, with a monohydric compound selected from the group consisting of phenol, naphthol and alkyl- and aralkyl-substituted phenols and naphthols, said monohydric compound being used in a molar amount at least equivalent to the number of alkyl ester groups contained in said dialkyl ester, in the presence of an ester radical interchange catalyst to temperatures above 160° C. to give a partial ester radical interchange, removing the cleaved-off alkanol formed in the resultant ester radical interchange reaction from the reaction mixture, isolating the resultant alkyl aryl ester, and reacting the obtained alkyl aryl ester with a nitrogen compound selected from the group consisting of ammonia and primary and secondary mono- and diamines in an inert organic solvent at temperatures of from 0° to 150° C.

8. Process according to claim 2, wherein said alkyl group of said alkyl aryl ester has 2 carbon atoms.

9. Process according to claim 2, wherein said alkyl group of said alkyl aryl ester has 3 carbon atoms.

10. Process according to claim 2, wherein said alkyl group of said alkyl aryl ester has 4 carbon atoms.

11. Process according to claim 2, wherein said alkyl group of said alkyl aryl ester has 5 carbon atoms.

References Cited

UNITED STATES PATENTS 3,252,977   5/1966   Renckhoff et al. ____ 260—247.2

ALEX MAZEL, *Primary Examiner.*

JOSE TOVAR, *Assistant Examiner.*